July 21, 1942.  L. DUNHAM  2,290,637
GENERATOR
Filed March 27, 1940   2 Sheets-Sheet 2
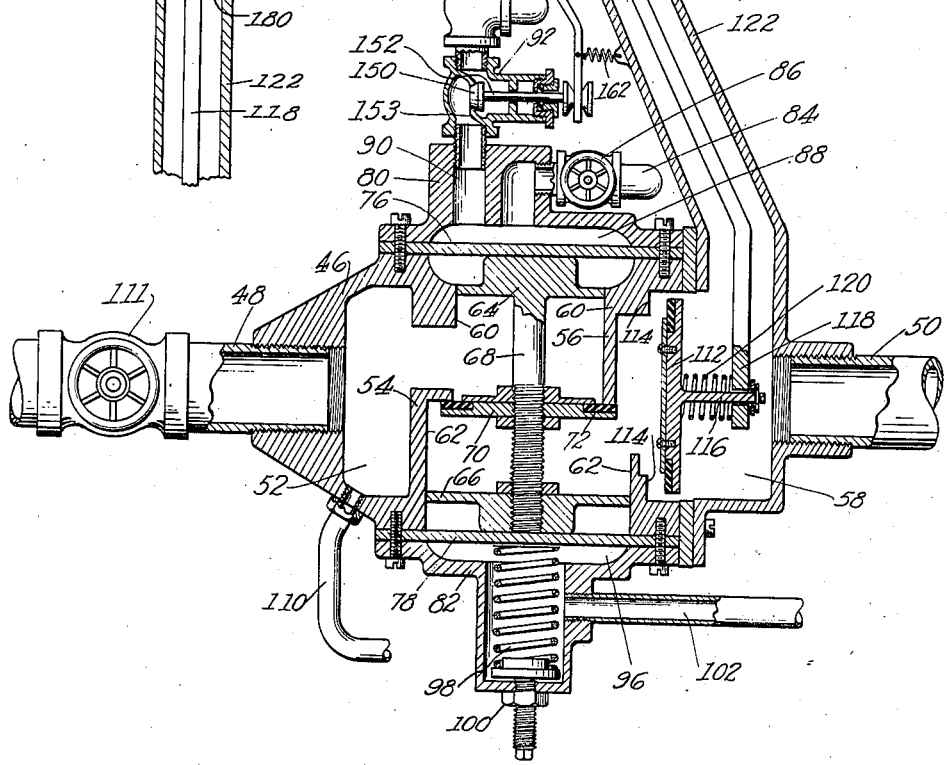

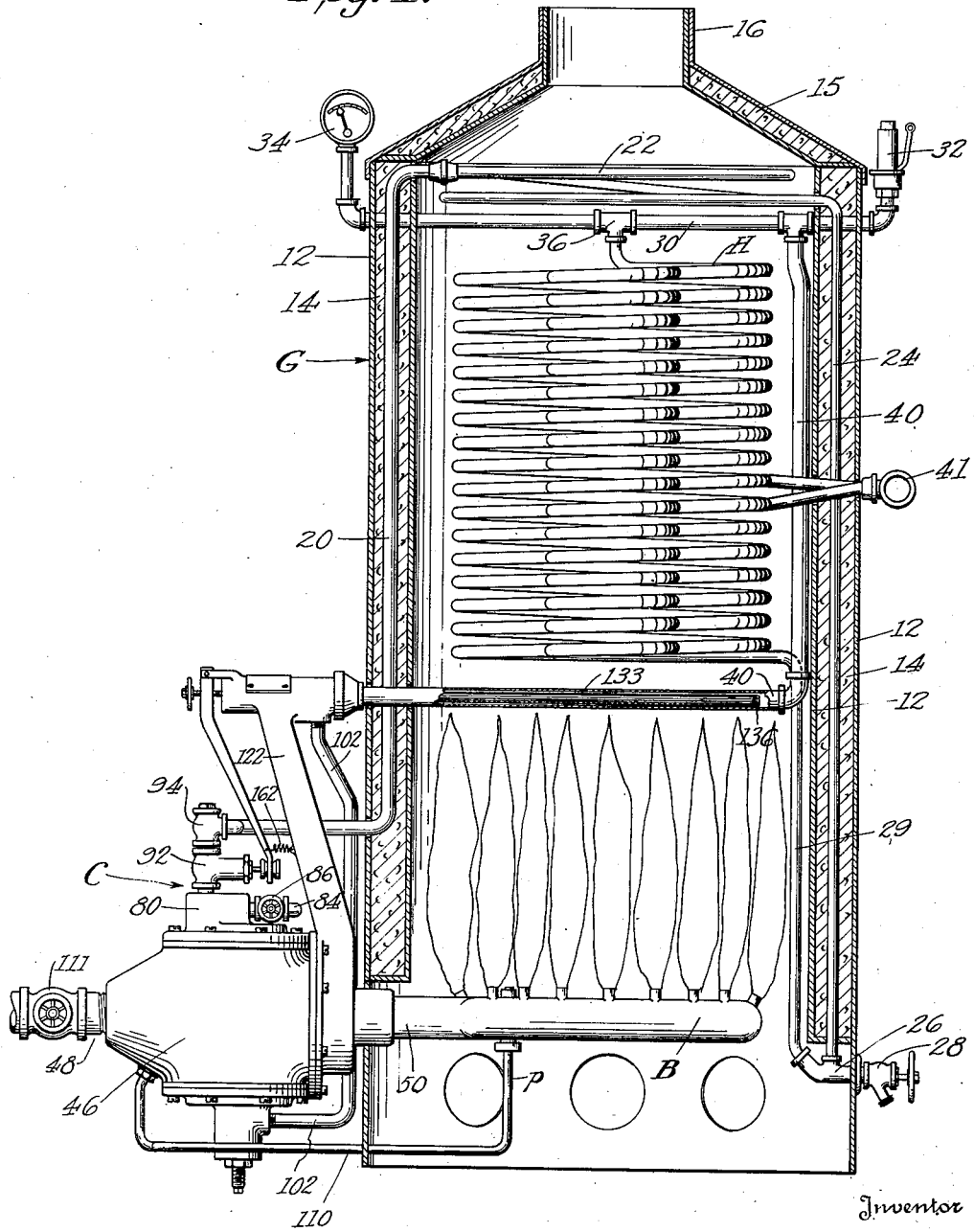

Patented July 21, 1942

2,290,637

UNITED STATES PATENT OFFICE 2,290,637

GENERATOR

Lewis Dunham, Hector, N. Y., assignor to Instant Steam Generator Corporation, Binghamton, N. Y., a corporation of New York Application March 27, 1940, Serial No. 326,261

2 Claims. (Cl. 122—448)

The present invention relates to heat exchange mechanism such as liquid heating generators, and particularly to means for safeguarding the construction and operation of the same.

An object of the invention is to provide a liquid heating generator having control means for the supply of fuel and liquid thereto. Said means comprises control mechanism for the fuel supplied to the burner of the generator which is actuated by the pressure of the feed liquid, as well as by the pressure of the fluid discharged from the generator. Said means also comprise control mechanism for the inflow of fuel to the burner, which is actuated by thermostatic means responsive to the temperature of the fluid in the generator, particularly the temperature of fluid in the discharge conduit from the generator. The control means also includes mechanism for control of the feed liquid supplied to the generator, which is actuated by said thermostatic means responsive to the temperature of the fluid in the generator, particularly the temperature of the fluid discharged from the generator.

One of the main objects of the invention is to provide control as mentioned above, which is simple in construction yet effective in operation. It is a purpose of the invention to provide all or a substantial part of the above control means in a unitary housing or casing which can be conveniently connected with a generator.

The invention may be used in association with such heat exchange mechanism as steam generators or flash type boilers. It may also be used with hot water heating plants, etc., wherever the control provided by the invention is found to be desirable.

Various other objects and advantages of the invention will be apparent as the specification progresses.

In the drawings, which are illustrative of one form which the invention may take, Figure 1 is a vertical sectional view of a heat exchange device, such as a steam generator, showing the control means of the invention associated therewith.

Figure 2 is an enlarged vertical sectional view through the control means shown in Figure 1.

Figures 3 and 4 are partial sectional views taken along the respective lines 3—3 and 4—4 of Figure 2.

Referring to Figure 1, a generator is shown at G comprising heating coils H in which steam may be generated, the liquid in said coils being heated by a burner B. The coils and burner are contained within a cylindrical casing comprising concentric cylindrical shells 12 with any appropriate insulating material 14 therebetween. The casing has a removable conical top 15, which joins with a centrally disposed stack 16. The generator is of conventional construction similar to that disclosed in the patent to Pangborn No. 1,991,572, February 19, 1935, The control means is designated C, and includes a number of devices presently to be described, which control the inlet of fuel to the burner B as well as the inlet of liquid to the coils H.

The water enters the coils H through a vertical conduit 20, which passes upwardly through the insulation between the shells of the generator casing, and joins with a short preheating coil 22 disposed within the casing of the generator below the stack 16. This preheating coil takes advantage of what might be waste heat passing through the stack and serves to preliminarily heat the liquid before it passes to the main steam generating coils.

The liquid, after passing through the preheating coils 22, courses downwardly through a vertical conduit 24 between the shells of the generator casing to a union 26, which is connected with a drain cock 28, and from the union 26 there is a pipe 29 passing upwardly within and connecting with the lower end of the coils H. Steam generated in the coils H passes upwardly therethrough to the horizontally disposed pipe 30. The ends of the pipe 30 extend through the walls of the casing and carry a suitable relief valve 32 and a pressure gauge 34 on the exterior thereof. The pipe 30 is centrally connected with the upper end of the coil H by a union 36. The steam generated in the coils H discharges from pipe 30 downwardly through an outlet pipe or conduit 40.

While I have shown the heated water inlet pipe 29 connecting with the lower end of the coils H, the apparatus may be modified by having said pipe connect with the upper end of the coils, in which case the outlet pipe 40 may lead from the lower instead of the upper end of the coils.

The coils H may be made in any number of detachable sections, for convenience and economy in repairing and replacing the same. The ends of certain of the sections may extend through the walls of the casing, and may there be joined by a short length of curved pipe 41. This permits removal of one section, leaving the other in place, and coil cleaning compound may be conveniently poured into the coils from the exterior of the casing by removing the length of pipe 41.

While the control means presently to be described may be used in association with a generator having coils with traps therein, as disclosed in the said Pangborn Patent No. 1,991,572, I prefer to employ coils of conventional construction without traps therein, wound either concentrically or eccentrically.

Referring to Figure 2, the control device includes a metal casting or housing 46 having a passage therethrough constituting a fuel conduit from one end of the housing to the other. At one end of the housing, there is an opening in which is connected an inlet fuel pipe 48 and at the other end of said housing is an opening for receiving the fuel outlet pipe 50, the latter connecting with the burner B as shown in Figure 1.

Within the housing 46 on the inlet side thereof is a fuel inlet chamber 52, and there are webs or partitions 54 and 56 within the hollow housing which separate the fuel inlet chamber 52 from the fuel outlet chamber 58 of the housing.

Substantially centrally of the housing the webs 54 and 56 form upper and lower cylindrical surfaces 60 and 62, and in these upper and lower cylindrical surfaces circular valve guides 64 and 66 are adapted to move vertically, said guides being secured to a valve stem 68. The valve stem has adjustably secured thereto a circular fuel control valve disc 70, which carries a ring of any suitable sealing material 72 around its periphery on the upper face of the disc, to engage and seal with a circular valve seat formed by the webs 54 and 56.

When the valve 70 engages its seat, the fuel inlet and outlet chambers are isolated from one another, and the fuel conduit through the housing is closed. Lock nuts on opposite sides of the valve disc 72, and threaded to the valve stem 68, rigidly secure said disc in place, and permit its adjustment on the valve stem so that the valve will function at any desired pressure. The guide 66 is threaded to the valve stem and secured thereon by a lock nut as shown.

The guides 64 and 66 bear against upper and lower flexible diaphragms 76 and 78 respectively of rubber or the like, said diaphragms being held in place by hollow upper and lower end caps 80 and 82 respectively, which are removably secured to the housing as by lock nuts or other suitable means, as shown.

The feed water inlet pipe 84 connects into the hollow upper cap 80 through a stop valve 86, and the feed water enters a pressure chamber 88 in the cap 80 above the diaphragm 76. There is an outlet 90 in the upper cap leading from the pressure chamber 88, and connected therein is a feed water control valve 92. Above control valve 92 there is a stop valve 94, from which extends the feed water inlet pipe 20.

The lower cap 82 is hollowed out to provide a second pressure chamber 96 beneath the diaphragm 78, and said cap has a hollow depending cylindrical portion carrying a low pressure spring 98 bearing against the lower side of the diaphragm 78. The tension of the spring 98 may be adjusted by a screw and follower arrangement 100 of the type disclosed in the said Pangborn Patent No. 1,991,572. A pipe 102 connects with the lower pressure chamber 96, said pipe leading from the steam outlet pipe 40 from the coils H, as shown in Figure 2.

The hollow caps 80 and 82 are preferably removably secured to the housing 46 by cap screws, as shown.

The fuel inlet valve member 70 is under the control of the difference in pressure in the feed water inlet chamber 88 and the generator outlet steam pressure in the pressure chamber 96. That is, the fuel feed valve 70 is held closed by the combined pressure of the outlet steam in the chamber 96 and the pressure of the spring 98. When the water inlet pressure in the chamber 88 is sufficient to overcome the steam pressure in the chamber 96 plus the pressure of the spring 98, the valve member 70 is moved to open position and fuel is fed to the burner B. The flow of fuel to the burner will, of course, result in the increased production or generation of steam, which will in turn increase the pressure in the chamber 96, thus tending to close the fuel inlet control valve. By adjustment of the spring 98, a delicate balance of pressures may be obtained, and desired opening and closing of the fuel inlet valve results, in the automatic operation of the generator.

If the supply of feed water is for any reason shut off, the spring 98 is strong enough to close the fuel inlet valve 70, to prevent damage to the coils H, even if there is no back pressure in the chamber 96.

As shown in Figures 1 and 2, there is a fuel pipe 110 extending from the inlet chamber 52 of the housing to the pilot p (Figure 1) so that there is always an igniting flame present to light off the burner when the fuel valve 70 is opened, and assuming the master valve 111 in the fuel line has been opened.

Additional control means for the inlet of fuel to the burner is also provided by means of a second circular fuel control valve member 112, of construction similar to that of the valve 70, having a seating surface adapted to engage a circular valve seat 114 formed by portions of the interior webs or partitions of the housing which define the fuel conduit through the housing. The valve member 112 has a stem 116 extending for movement through the lower and longer arm 118 of a pivoted and bent operating lever. There is a safety spring 120 between the valve and the lever to cushion the engagement of the valve member with its seat, in case there is excess movement of rod 133 due to heat.

The arm 118 of the operating lever extends upwardly through a hollow duct 122 and is pivoted to the walls of said chamber as at 124. The lever continues on beyond the pivot in the form of a short arm 126, having an enlarged opening 127 therein, through which passes the threaded end 128 of a rod element of a thermostat subsequently to be described. Suitable lock nuts 129 are threaded on to the portion 128 of the rod, so that the same may be adjusted through and with respect to the short arm of the bent valve operating lever, when plate 159 is removed, and so that said lever may be displaced on its pivot, as hereinafter described.

The steam outlet pipe 40 from the coils of the generator passes through the casing thereof, and connects with a hollow union 130 which is integral with, or secured to the upper end of the hollow duct 122. At one end of the union 130, on the interior thereof, a hollow thermostat tube 132 of metal which readily expands and contracts under the influence of heat, is rigidly secured as at 134. This tube 132 extends inwardly through the outlet pipe 40 entirely across the lower end of the boiler and its inner end is welded to the inner end of the valve operating rod 133 as at 136. The rod 133 is made of metal which is substantially immune to expansion and contraction due to changes in temperature. The rod 133 passes through the outer end of the housing 132 as at 149 to connect with the small arm 126 of the valve operating lever.

The pipe 102 which conveys outlet steam from the pipe 40 to the lower chamber 96 of the control housing 46 is connected into the hollow union 130, as shown in Figure 2. There is also an outlet 142 in union 130 leading from the interior of the pipe 40, as shown in Figure 2. The line for the generated steam is connected into this outlet.

When the temperature in the outlet pipe 40 becomes excessive, regardless of the pressure of fluid therein, the thermostatic tube 132 elongates, and draws the rod 133 toward the right, as viewed in Figure 2. This movement, although slight, moves the valve operating lever around its pivot 124, and because of the relative lengths of the arms 118 and 126 of the operating rod the relatively slight movement caused by the elongation of the tube 132 is amplified, causing the valve member 112 to be moved into firm engagement with its seat 114.

As shown in Figure 4, outlet pipe 40 is elliptical in cross section, and is in heat conductive contact with tube 132 at diametrically opposed points. Thus the feed liquid and fuel inlet valves will be operated by excessive temperature in the generator, even if there is no steam in outlet pipe 40, due, for instance, to some fault in the feed liquid inlet line.

Therefore, if for some reason other parts of the system become inoperative, and the boiler has insufficient water while the burner is still lighted, destruction of the heating coils is prevented, for this excessive heat in the outlet of the generator and at a point immediately above the burners, will cause the closing of the valve 112 and thus the burners will be extinguished.

From the above, it will be apparent that I have provided in the unitary housing, two control means governing the flow of fuel to the burner of the generator. One of these control means or valves is actuated by the pressure of feed water, acting against the outlet pressure of steam or fluid from the generator, while the other of the control means or valves is governed by the temperature in the generator, or in the outlet pipe therefrom.

In addition to thus controlling the inlet of fuel to the generator, I have also found it desirable to control the inflow of feed water thereto in response to temperature conditions in the generator, to maintain a desired uniform temperature of steam discharged from the generator. Referring to Figure 2, the feed liquid inlet valve 92 has a valve member 150 carried by valve stem 152, and a valve seat 153. The valve stem connects with a bent valve operating lever 156 which is pivoted adjacent its upper end at 158 to an extension 169 of the union 130. A spring 162, connected between the outer wall of the hollow duct 122 and the valve operating lever 156, is adapted to bias the valve 150 away from its seat.

Carried within the upper end of the hollow duct 122 is a diaphragm 164. This diaphragm is held in place between a cup shaped guide 165 and a circular locking screw 166 threaded into an opening in the duct 122 against the diaphragm. The guide 165 is held against inward movement in the duct 122 by a collar 167. The guide 165 has a central opening therein, through which passes an extension 168 integral with the central portion of the diaphragm. The end portion 128 of the rod 133 is threaded into the extension 168 of the diaphragm.

In the upper end of the lever 156 there is an adjustable screw 172, having a calibrated finger wheel 174 on the outer end thereof. The inner end of the screw 172 bears against the outer face of the diaphragm 164.

By reason of the tension of the spring 162, the inner end of the screw 172 is constantly held in engagement with the diaphragm 164. When excessive temperature occurs within the generator, or within the discharge conduit 40 thereof, the movement of the rod 133 to the right, (Figure 2), caused by elongation of the thermostatic tube 132, causes a minute movement of the diaphragm 164 away from the inner end of the screw 172, which movement is amplified at the lower end of the lever 156. This minute movement permits the spring 162 to move the lever 156 around its pivot 158, and moves the valve 150 from its seat, causing inflow of water into the coils H of the generator. It will be understood that the diaphragm extension 168 can move through the central opening in the guide disc 165.

Under normal operating conditions, the valve member 150 is adjusted by means of the finger wheel 174 on the set screw 172 so that at normal temperatures, the valve member opens to periodically feed water into the boiler. This feed water control in response to temperature is, of course, a safety feature, providing for inlet of water into the boiler when dangerous heat conditions occur, and is furthermore a means for delicately regulating the inlet of water into the boiler to control the quality of the steam generated, from saturated steam to dry superheated steam, for any desired period of time and for any purpose. This control does not depend on the pressure of steam in the generator nor on the pressure of the feed water supplied to the coils which may be supplied from mains at varying pressures and temperatures. By this adjustment, the steam discharged from the generator can be maintained at a desired temperature.

Thus it will be seen that I have provided thermostatic means for controlling the inlet of fuel and feed water to the generator, comprising an expansible tube and associated valve operating rod or bar, and a diaphragm operated thereby, responsive to the temperature of fluid in the generator or in the outlet therefrom.

It will be noted that the fuel control valve 112 is operated by the same thermostatic means as the steam quality or feed water inlet valve 150. Thus, a more accurate balance between feed liquid inlet and heat of combustion of the fuel is maintained, than would be the case with individual thermostats or separate control means. Excess heat loss through the stack of the generator is prevented with resulting economy of operation. The generator is automatic in operation, and manual control is unnecessary, except for adjusting the operation of the steam quality or feed liquid inlet valve for the desired temperature.

The fuel control valve 70 shuts off the supply of fuel to the burner when steam pressure in the generator approaches that of the feed water, or at any point below feed water pressure, at the will of the opertaor. This valve shuts off all fuel supplied to the burner when the feed water supply is shut off manually, or because of an obstruction in the supply line, or for any other reason.

When the temperature within the generator exceeds that set on the temperature dial 174, the feed water inlet valve 150 is opened and permits more water to pass into the coils H. Thus the temperature of the steam generated does not exceed that set by the dial 174 for any significant length of time.

As shown in Figure 3, the pivot 124 for the operating lever which carries the second fuel control valve is constructed and arranged to permit a fine adjustment of the engagement of said valve 112 with its seat 114. The inner end of said pivot 124 constitutes a crank 180 which passes through an opening in the lever arm 118. The throw of said crank, of course, need only be very slight. The valve operating lever is thereby pivoted on the crank portion of the pivot 124.

The outer end of the pivot 124 is mounted for turning adjustment in a bushing 182 which is threaded into an opening in the duct 122. The pivot is held in adjusted position by a releasable lock nut 184 threaded on its outer end, which nut bears against the outer end of the bushing 182. The lock nut is protected by a hollow cap 186 threaded on the outer end of the bushing 182.

It will be apparent that the second fuel inlet control valve member 112 may be adjusted from and toward its seat by removing cap 186, loosening nut 184 and then turning pivot 124, thus displacing the crank 180 on which the valve operating lever turns. This adjustment will, of course, be made after the lock nuts 129 on the end 128 of the rod 133 are released, the aperture 127 in the end of the arm 126 of the lever being sufficiently large to permit the resulting relative movement. After adjustment, the lock nuts 184 and 129 are tightened, and the cup 186 and cover plate 159 are replaced. Thus, the pressure with which valve member 112 engages its seat may be regulated.

It will be understood that the generator of this invention may be used in connection with systems which employ only a relatively cold fresh feed water, or with systems which utilize the condensate from the engine or apparatus which the steam operates, to supply a part of the feed water.

In case condensate from the plant being operated is employed, when the generator is first started up, and the steam is supplied to the plant or system being operated, the condensate therefrom will be initially relatively cold, as compared with the temperature of said condensate after the apparatus being operated is warmed up.

When the generator is initially placed in operation, the dial 174, is adjusted to produce the quality of steam desired. The burners will continue to supply their maximum heat until the pressure of steam generated is sufficient to close the valve 70, or until the temperature of the generated steam in the outlet pipe 40 is sufficient to close the fuel valve 112. If it is the temperature of the generated steam which closes the inlet of fuel to the burners, the feed water inlet valve 92 will also be opened, permitting more liquid to enter the coils of the generator, which liquid will continue to enter until the temperature drops to that set on the dial 174.

As steam is supplied to the plant or system being operated, the condensate therefrom, used for feed water, will increase in temperature, and as this liquid enters the generator, it will not take as many heat units to convert it to steam at the temperature of the dial 174 as was the case with the relatively cold feed water. However, no matter what the initial temperature of the feed water, the operation of the system as described above will be such as to maintain the steam generated at the temperature set on the dial 174, by automatic control of the inlet of feed water as well as the inlet of fuel to the burners.

As the system warms up, steam will thus be generated more quickly, and thus more feed water will pass to the coils as the steam is discharged therefrom. If the increased quantity of feed water lowers the temperature of the generated steam, the thermostat will operate to shut off the excessive inflow of feed liquid so that the burners may again raise the temperature to the desired degree, as set on the indicator 174.

In operation, small changes in steam temperature are controlled by the automatic opening and closing of the valve 92. If the operation of this valve is not sufficient to prevent undesirable rising of the steam temperature, the fuel valve 112 will operate to shut off the fuel to produce the same result.

It will be apparent that various changes may be made in the apparatus disclosed herein without departing from the invention.

I claim:

1. Control means for the fuel supplied to the burner of a liquid heating generator, and for the feeding of liquid thereto, comprising a housing including a fuel conduit therethrough, said conduit having a valve therein governing the flow of fuel to the burner, a supply line for feeding liquid to the generator including a pressure chamber in said housing, means in said housing responsive to the pressure of the feed liquid in said chamber for controlling the opening and closing of said fuel control valve, a feed liquid valve in said supply line, means responsive to the temperature in the generator for controlling the opening and closing of said feed liquid valve, a second fuel valve carried by said housing governing the flow of fuel through said conduit to the burner, and means operatively connecting said second fuel valve with said means responsive to the temperature in the generator, for controlling the opening and closing of said second fuel valve.

2. Control means for the fuel supplied to the burner of a liquid heating generator, and for the feeding of liquid thereto, comprising a unitary housing including a fuel conduit therethrough, said conduit having a valve therein governing the flow of fuel to the burner, a supply line for feeding liquid to the generator including a pressure chamber in said housing at one end thereof, a second chamber in said housing at the opposite end thereof in communication with the outlet of fluid from the generator, pressure responsive means in each of said chambers operatively connected with said fuel valve and acting against one another in response to the pressure of feed liquid and fluid from the generator in said respective chambers, for controlling the opening and closing of said fuel valve, a feed liquid valve in said supply line, a second valve carried by said housing governing the flow of fuel through said conduit to the burner, and means responsive to the temperature in the generator for controlling the opening and closing of said feed liquid valve and said second named fuel valve.

LEWIS DUNHAM.